United States Patent

[11] 3,572,750

| [72] | Inventor | Millard A. Derr, Jr. |
| | | 17 Richard Court, Orinda, Calif. 94563 |
| [21] | Appl. No. | 834,622 |
| [22] | Filed | June 19, 1969 |
| [45] | Patented | Mar. 30, 1971 |
| | | Continuation-in-part of application Ser. No. 785,536, Dec. 20, 1968, now abandoned. |

[54] ANTI-SWAY DETENT DEVICE
7 Claims, 13 Drawing Figs.
[52] U.S. Cl. .................................................. 280/446,
280/406, 280/488
[51] Int. Cl. ..................................................... B62d 53/00
[50] Field of Search .......................................... 280/406,
406 (.1), 446, 446 (.3), 150.5, 488

[56] References Cited
UNITED STATES PATENTS
| 3,194,584 | 7/1965 | Reese | 280/406(.1) |
| 3,273,911 | 9/1966 | Waldie | 280/446(.3) |
| 3,306,628 | 2/1967 | Haxton | 280/406(.1) |
| 3,353,842 | 11/1967 | Lewis | 280/406(.1)X |

FOREIGN PATENTS
| 1,456,776 | 9/1966 | France | 280/446(.3) |
| 695,898 | 9/1940 | Germany | 280/446.(3) |

*Primary Examiner*—Leo Friaglia
*Attorney*—Townsend & Townsend

ABSTRACT: An elongated hitch member for attachment to and rearward projection from a towing vehicle and a trailer tongue with its forward end pivotally secured to the hitch member for oscillation about a first upstanding axis. An elongated connecting link is provided and supported at its forward end from the hitch member for oscillation about a second upright axis disposed rearwardly of the first axis and connected at its rear end to the tongue rearward of the second axis for angular displacement about a third upstanding axis relative to the tongue and in a manner to yieldingly resist such angular displacement from a position with the connecting link generally paralleling the longitudinal axis of the tongue.

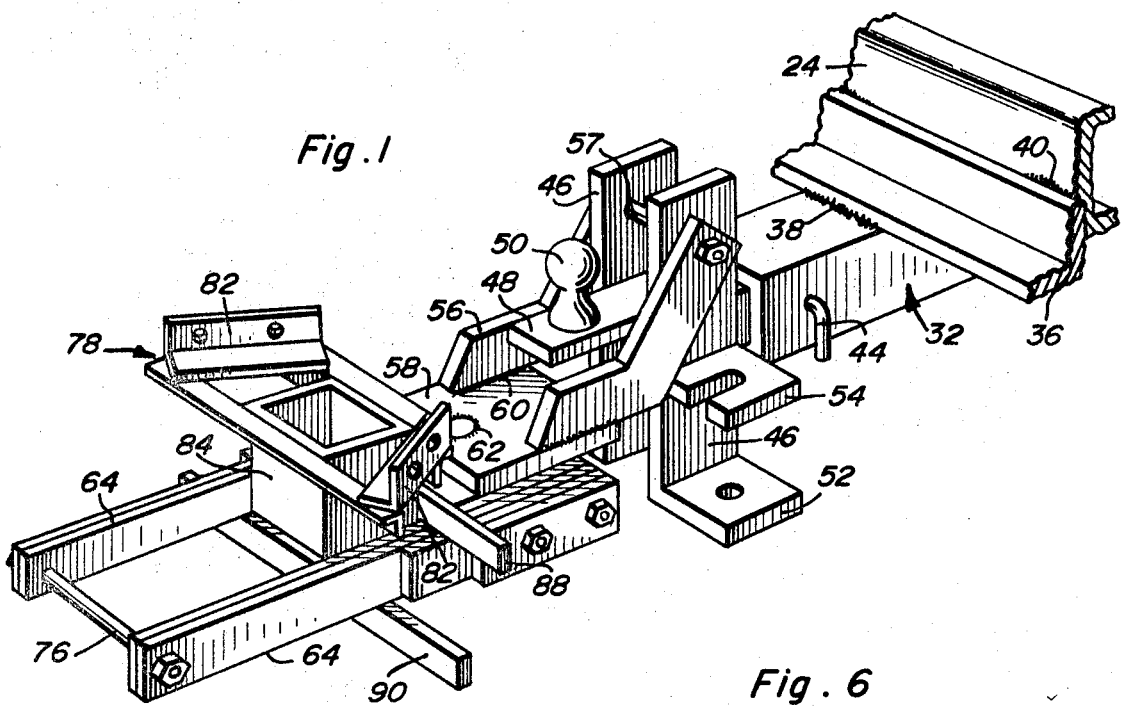
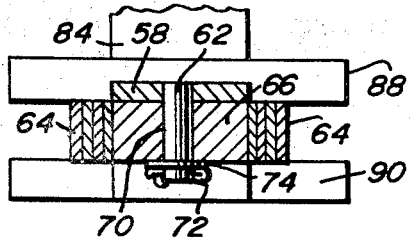
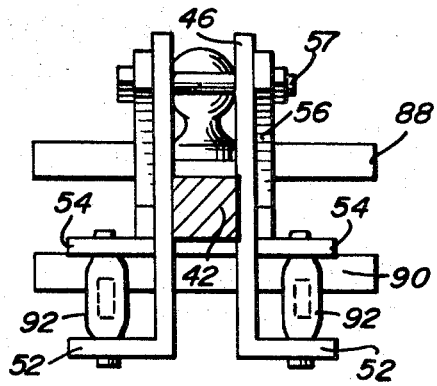
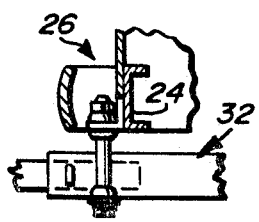
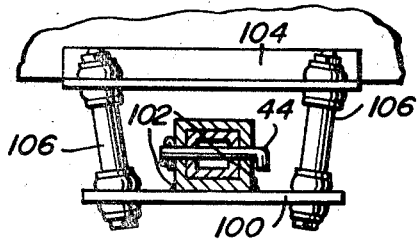
Millard A. Derr, Jr.
INVENTOR.

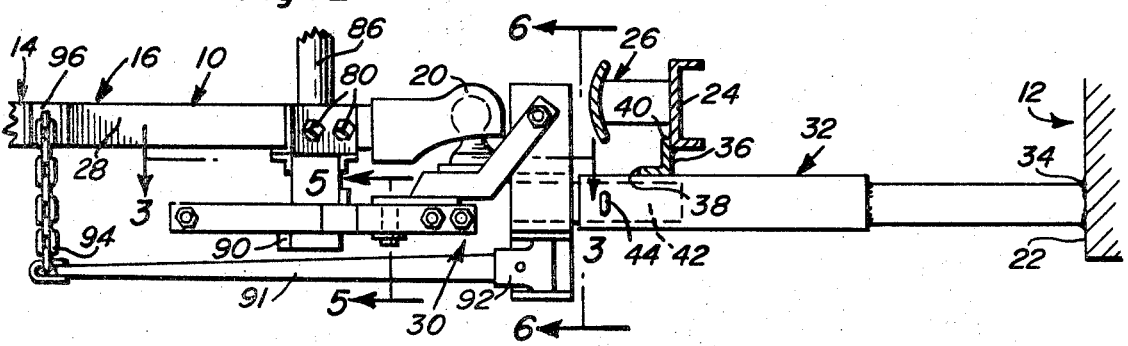
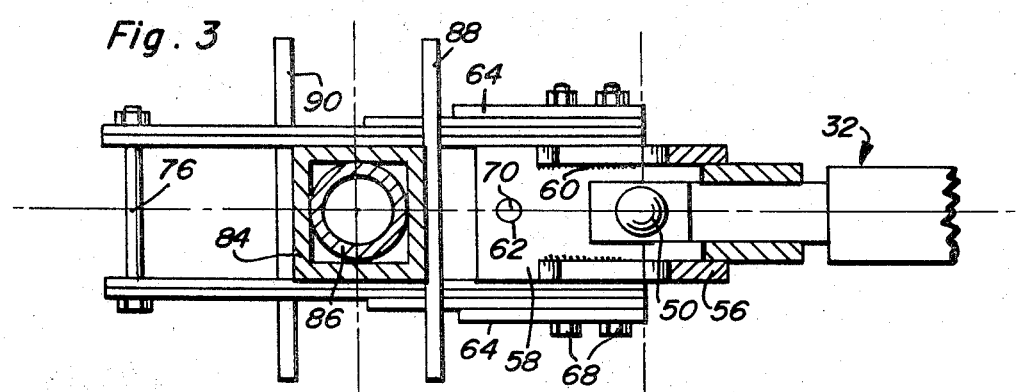
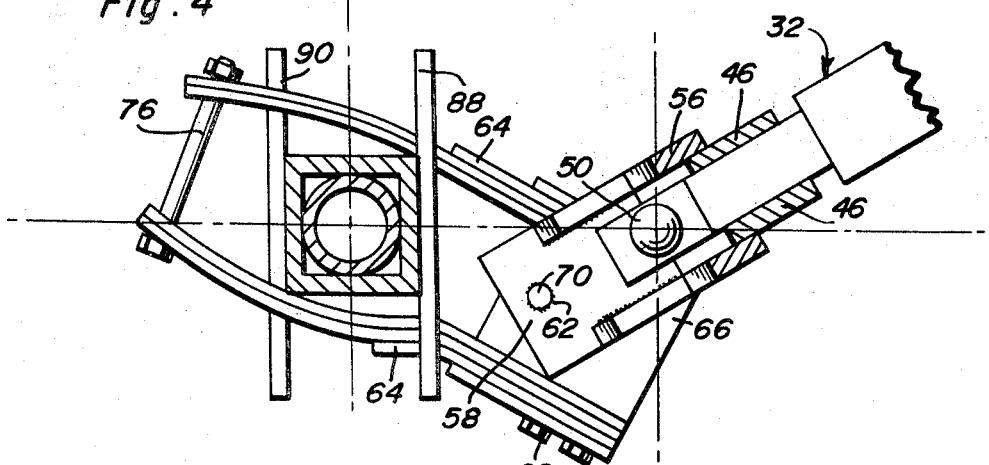
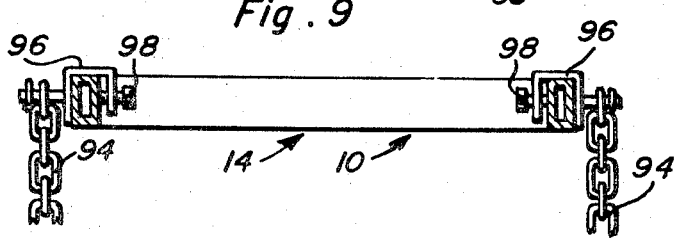

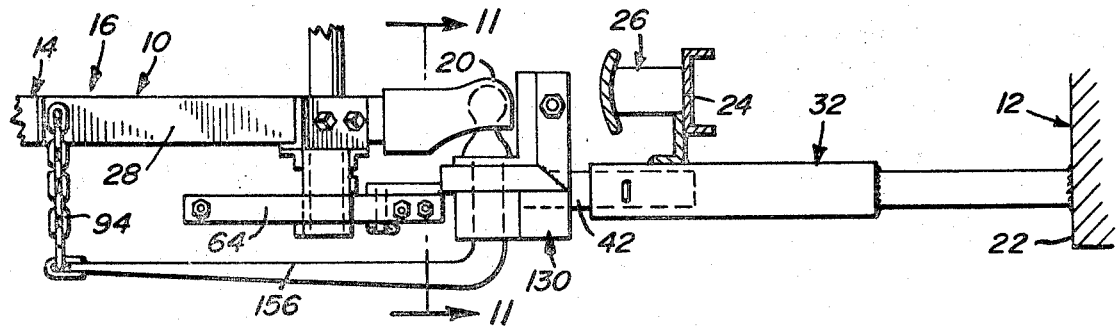
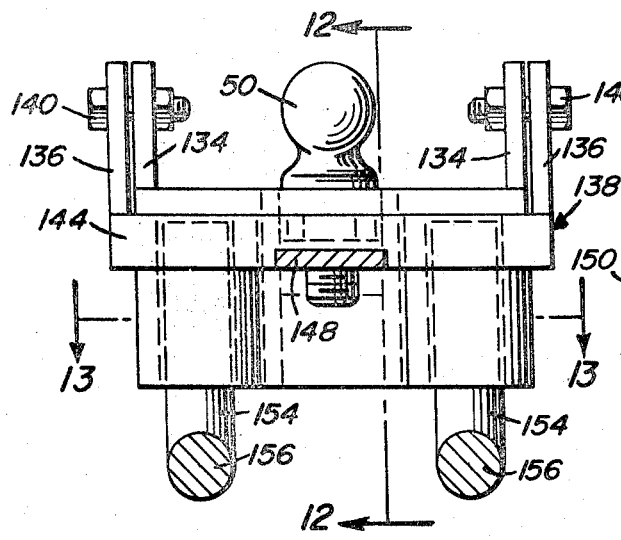
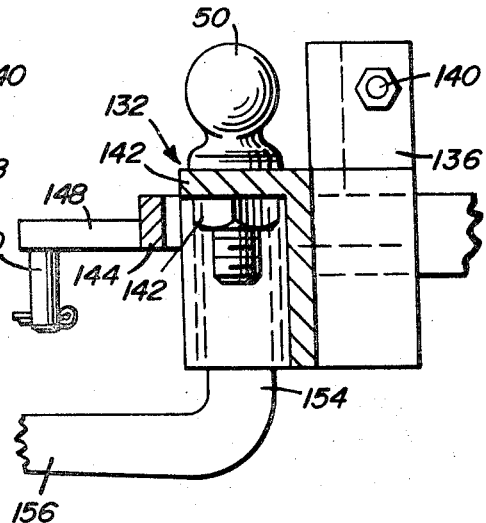
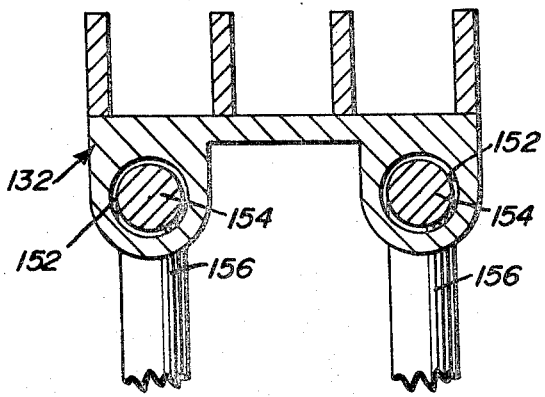
Millard A. Derr, Jr.
INVENTOR.

3,572,750

ANTI-SWAY DETENT DEVICE

This application comprises a continuation-in-part of my copending U.S. Ser. No. 785,536, filed Dec. 20, 1968, for Antisway Trailer Hitch and now abandoned.

The antisway device specifically illustrated and described hereinafter includes many basic structural components and operational features of the antisway trailer hitch disclosed in my above-mentioned copending application. However, the antisway trailer hitch of my copending application utilizes load transferring or spring bars not only to transfer a portion of the vertical loading on the forward end of the associated trailer tongue to the front wheels of the pulling vehicle but to also yieldingly resist angular displacement of the trailer tongue relative to the longitudinal axis of the vehicle. The antisway device of the instant invention, on the other hand, provides means for yieldingly resisting angular displacement of the corresponding trailer tongue relative to the longitudinal axis of the towing vehicle in addition to separate load transferring arms, if the latter are desired. In this manner, the antisway device may be more readily incorporated into the manufacture of trailer hitches presently being produced and may be utilized on lower capacity trailer hitches which do not require load transferring spring arms.

However, the improved antisway device of the instant invention is designed to provide the same operating characteristics as the antisway trailer hitch disclosed in my copending application. It may be utilized in conjunction with substantially all forms of wheeled vehicles other than the various types of special truck-type vehicles specifically designed to pull semitrailers and having trailer connections disposed adjacent or forward of the vertical plane containing the rear axle of such a special vehicle. It is designed to function so as to substantially entirely eliminate lateral swaying of the juncture between the associated trailer and towing vehicles which can be caused by the crown of a road, lateral wind forces and improper loading of the trailer. In addition, its improved design provides greater road clearance than the antisway trailer hitch disclosed in my copending application and it is of less complicated construction and more efficient in operation.

The main object of this invention is to provide a trailer tongue and hitch construction therefor for attaching a trailer to the towing vehicle in a manner that the usual articulate connection between the trailer and the towing vehicle is provided, but in a manner establishing an effective point of attachment of the trailer tongue to the towing vehicle closely adjacent the rear axle of the towing vehicle, at least when the trailer is being towed at highway speed and not around sharp corners.

It is also another object of this invention to provide a tongue and tow-hitch construction including operative components thereof for transferring a portion of the vertical loading on the trailer tongue to the forward end of the towing vehicle.

Yet another object of this invention is to provide a trailer tongue and hitch construction including structural features thereof coacting to substantially eliminate any tendency of lateral swaying of the point of connection of the trailer to the associated vehicle while the vehicle and trailer are moving in a generally straight direction.

A final object of this invention to be specifically enumerated herein is to provide a trailer and tow hitch construction which will conform to conventional forms of manufacture be of simple construction, easy to use, and which will provide for full horizontal deflection during parking or other low speed maneuvering in tight places, so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

FIG. 1 is a perspective view of a trailer hitch construction having the antisway device of the instant invention incorporated therein and with a portion of the towing vehicle being shown fragmentarily;

FIG. 2 is a side elevational view of the assemblage illustrated in FIG. 1 but with an associated trailer tongue portion and attendant load transferring arms illustrated in operative association with the antisway device;

FIG. 3 is an enlarged fragmentary horizontal sectional view taken substantially upon the plane indicated by section line 3–3 of FIG. 2;

FIG. 4 is a fragmentary horizontal sectional view similar to FIG. 3 but illustrating the relative positions of the various components of the antisway device in the positions they assume when the towing vehicle is turned relative to the trailer;

FIG. 5 is an enlarged fragmentary transverse vertical sectional view taken substantially upon the plane indicated by section line 5–5 of FIG. 2;

FIG. 6 is an enlarge fragmentary transverse vertical sectional view taken substantially upon the plane indicated by the section line 6–6 of FIG. 2;

FIG. 7 is a fragmentary side elevational view of a modified form of attachment of the antisway device to the towing vehicle;

FIG. 8 is an enlarged fragmentary transverse vertical sectional view taken substantially upon a plane passing through the rear portion of the assemblage illustrated in FIG. 7 and as seen from the left side of the latter;

FIG. 9 is a fragmentary transverse vertical sectional view illustrating the manner in which the attaching chains secured to the rear ends of the load transferring arms are releasably attached to the convergent frame members of the trailer tongue;

FIG. 10 is a side elevational view similar to FIG. 2 but illustrating a modified form of antisway device utilizing a pair of modified load transferring spring arms which provide greater ground clearance than the assemblage illustrated in FIG. 2;

FIG. 11 is an enlarged fragmentary transverse vertical sectional view taken substantially upon the plane indicated by section line 11–11 of FIG. 10;

FIG. 12 is a fragmentary longitudinal vertical sectional view taken substantially upon the plane indicated by section line 12–12 of FIG. 11; and FIG. 13 is a fragmentary horizontal sectional view taken substantially upon the plane indicated by section line 13–13 of FIG. 11.

Referring now more specifically to the drawings the numeral 10 generally illustrates a conventional form of trailer and the numeral 12 generally designates a conventional form of towing vehicle. The trailer 10 includes a main frame referred to in general by the reference numeral 14 whose forward end includes a trailer tongue referred to in general by the reference numeral 16. A socket hitch element 20 of conventional design is carried by the forward end of the tongue and the vehicle 12 includes a first frame portion 22 and a second frame portion portion 24. A rear bumper assembly referred to in general by the reference numeral 26 is supported from the second frame portion 24 and the first frame portion 22 may be considered as a transverse frame member disposed generally in the area of the rear axle (not shown) of the vehicle 12.

The entire trailer hitch assembly of the instant invention including the antisway device is provided for coupling the trailer 10 to the rear end of the vehicle 12 and it is to be appreciated that the tongue 16 and the socket hitch element 20 comprise conventional components, the trailer tongue including forwardly convergent members 28 joined at their forward ends and supporting the socket hitch element 20.

The antisway device is referred to in general by the reference numeral 30 and includes an elongated bar assembly referred to in general by the reference numeral 32. The forward end of the bar assembly 32 is secured to the frame portion 22 in any convenient manner such as by welding 34 and the rear end portion of the bar assembly is hollow and is secured to the second frame portion 24 by means of an angle bracket welded to the bar assembly 32 as at 38 and to the second frame portion as at 40. A short bar portion 42 has its forward end telescoped and secured in the rear hollow end of the bar assembly 32 and a removable fastener 44 is provided for retaining the forward end of the bar portion 42 within the rear end of the bar assembly 32. The rear end of the bar assembly 42 has a pair of upstanding opposite side plates 46 secured thereto and a horizontally disposed mounting plate 48 has its forward end secure, either directly or indirectly, to the rear end of the bar portion 42 at the desired elevation and between the upstanding plates 46. A ball hitch element 50 is supported from the rear of the mounting plate 48 and the lower ends of the upstanding plates 46 include oppositely outwardly directed apertured ears or mounting lugs 52. Further, a second pair of slotted mounting ears or lugs 54 are supported from the upright plates 46 above the mounting ears 52.

A pair of rearwardly and downwardly inclined support arms 56 have their upper ends pivotally secured to the outer surfaces of the upright plates 46 by means of a pivot fastener 57 horizontally aligned with the vertical center of the element 50 and secured to the upright plates 46 and the upper ends of the arms 56. A mounting plate 58 is secured between the lower rear ends of the arms 56 in any convenient manner such as by welding 60 and the plate 58 has the upper end of a pivot pin 62 secured therethrough.

A pair of multileaf springs 64 are provided and interconnected at their forward base ends by means of a connecting block 66 secured therebetween by means of suitable fasteners 68 secured through the leaf spring 64 and the block 66. The block 66 has a vertical bore 70 formed therethrough and the lower end of the pivot pin 62 is secured through the bore 70 by means of a cotter pin 72 and washer 74 with the plate 58 overlying the block 66.

The ends of the leaf springs 64 remote from the connecting block 66 are interconnected by means of a fastener 76 secured therethrough and a mount assembly generally referred to by the reference numeral 78 is provided and secured to the tongue 16 by means of suitable fasteners 80 secured through opposite side forwardly convergent apertured flange portions 82 of the mount assembly 78.

The mount assembly 78 includes a depending tubular member 84 which is square in cross-sectional shape and registered with the lower end of a jack post 86 carried by the tongue 16. The post 86 has its lower end received in the upper end of the tubular member 84 and the jack post 86 may be lowered by suitable means (not shown) through the tubular member 84 for contact with the ground in order to raise the forward end of the tongue 16 relative to the ground.

The tubular member 84 has an upper transverse bar 88 secured to its forward surface and a lower transverse bar 90 secured to its rear surface. The bars 88 and 90 are disposed in vertically spaced planes and the rear ends of the leaf springs 64 extend horizontally between the bars 88 and 90 and through a point spaced rearward thereof. Further, from a comparison of FIGS. 3 and 4 of the drawings, it may be seen that when the bar assembly 32 is longitudinally aligned with the center line of the tongue 16 the leaf springs 64 closely embrace and parallel the opposite sides of the tubular member 84. However, when the bar assembly 32 is angularly displaced about a vertical axis extending through the ball hitch hitch element 50 relative to the trailer tongue 16, as illustrated in FIG. 4, the spacing between the vertical center axis of the ball hitch element 50 and the longitudinal axis of the pivot pin 62 cause the connecting link comprising the connecting bar 66 and the leaf spring 64 to be angularly displaced in the opposite direction whereupon the left front corner of the tubular member 84 and the right rear corner of the tubular member 84 tend to spread apart the leaf springs 64 as the connecting link is angularly displaced relative to the longitudinal center axis of the trailer tongue 16. Accordingly, it may be seen that the leaf springs 64 yieldingly resist angular displacement of the connecting link established by the connecting block 66 and the leaf springs 64 and therefore any tendency of the connection between the ball hitch element and the socket hitch element 20 to sway from side-to-side. The device 30 provides great resistance to horizontal displacement when in the centered position, but once displaced at least 10° from the centered position the device resists further displacement only slightly. The device also has the characteristic of tending to snap into the centered position when returned to within several degrees of that position. However, it is to be appreciated that when it is desired to intentionally turn the vehicle 12 relative to the trailer 10, the torque applied to the connecting link established by the block 66 and leaf spring 64 will be sufficiently great to cause the connecting link to be angularly displaced and the rear ends of the leaf spring 64 to be spread apart in the manner illustrated in FIG. 4 os of the drawings. Further, the pivot fastener is horizontally aligned with the vertical center of the element 50 in order to minimize longitudinal shifting of the leaf springs 64 relative to the tubular member 84 as the trailer 10 and tow vehicle 12 more over a rise or a depression. This feature is necessary in order to prevent interference between the tubular member 84 and connecting block 66 and to provide a consistant horizontal resistance to deflection.

With attention now invited more specifically to FIGS. 2 and 9 of the drawings, there may be seen a pair of opposite side load transferring spring arms 91 which have vertically disposed crossheads 92 at their forward ends whose upper and lower end portions are received through the corresponding apertured mounting ears 54 and 52. In addition, the rear ends of the load transferring spring arms 91 have one pair of corresponding ends of a pair of chain sections 94 secured thereto and the other pair of ends of the chain sections 94 are releasably anchored to the opposite side members 28 of the trailer tongue 16 by means of mounting clips 96 secured to the members 28 by means of setscrews 98.

With attention now invited more specifically to FIGS. 7 and 8 of the drawings there will be seen a slightly modified form of mounting of the rear end of the bar assembly 32 from the bumper assembly 26. In this embodiment, the lower outer surface of the rear end of the bar assembly 32 is secured to a crossbar 100 in any convenient manner such as by welding 102 and the crossbar 100 is suspended from an angle bracket 104 carried by the frame portion 24. A pair of upstanding elongated supports 106 similar to those utilized in my hereinbefore mentioned copending application are secured between the angle bracket 104 and the crossbar 100 for suspending the latter below the angle bracket 104. This construction is substantially identical to a similar construction disclosed in my copending application and it is to be further understood that the forward end of the bar 32 utilized in the embodiment of FIGS. 7 and 8 is pivotally attached to the frame portion 22 for oscillation about a vertical axis as opposed to rigidly secured thereto, this vertical pivot axis also being disclosed in my copending application.

With attention now invited more specifically to FIGS. 10—13 of the drawings, there may be seen a slightly modified form of antisway device referred to in general by the reference numeral 130. The device 130 also utilizes a bar assembly 32 as well as other components of the antisway device 30 which are designated by the same reference numerals. However, the antisway device 130 includes a mount structure referred to in general by the reference numeral 132. The mount structure 132 is secured to the rear end of the bar portion 42 and includes a pair of upstanding apertured mounting ears 134 to which upwardly directed and apertured mounting lugs 136 of a U-shaped bracket referred to in general by the reference numeral 138 are pivotally secured by means of pivot fasteners 140. The mounting structure also includes a horizontal flange portion 142 through which the shank portion of the ball hitch element 50 is secured by means of a nut 142 and the bight portion 144 of the U-shaped bracket 138 is spaced slightly forward of the mount structure 132 and supports a plate 148 similar to the plate 58 and which has the upper end of a pivot pin 150 secured therethrough. In addition, the mount structure 132 defines a pair of downwardly opening bores 152 in which the upturned ends 154 of a pair of spring load transferring arms 156 are secured. The rearward ends of the arms 156 are secured to the trailer tongue 16 by means of the chain sections 94 in the same manner in which the rearward ends of the arms 91 are secured to the trailer tongue 16 and the lower end of the pivot pin 150 is secured through the connecting block 66 secured between the forward ends of the leaf springs 64. Accordingly, it may be seen that the antisway device 130 operates in the same manner as the antisway device 30 except that the modified construction of the mounting structure and the modified form of spring load transferring arms 156 increase the ground clearance below the forward ends of the arms 156.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention.

I claim:

1. In a trailer hitch having an elongated tongue provided with first coupling means on a forward end of the tongue, a tow bar having front and rear ends and including mounting means for securing the tow bar to a rear portion of a towing vehicle, the tow bar including second coupling means coacting the first coupling means to releasably universally movably couple the first coupling means to the second coupling means, the improvement comprising an antisway device having detent means operatively connected between the tongue and the tow bar and having an upstanding member of a noncircular cross section for support from one of the tongue and tow bar and opposing spring arms for embracingly engaging the upstanding member, means for supporting the spring arms from the other one of the tongue and tow bar for yieldingly resisting horizontal angular displacement of the tow bar relative to the tongue about an upstanding axis of the upstanding member from a predetermined position.

2. In a trailer hitch defined by an elongated tongue mounted to a trailer and having first coupling means on its forward end, a tow bar mounted to a towing vehicle and having second coupling means coacting with the first coupling means to releasably universally movably couple the first coupling means to the second coupling means, the improvement comprising an antisway device having: detent means operatively connected between the tongue and the tow bar for yieldingly resisting horizontal angular displacement of the tow bar with respect to the tongue about an upstanding axis from a predetermined position, the detent means including an elongated connecting link structure having a forward end pivotally secured to the tow bar rearward of the first and second coupling means for relative pivotal movements about a first upstanding axis, means connecting a rear end of the connecting link structure to the tongue for relative pivotal movements of the structure about a second upstanding axis disposed rearward of the first axis, and means mounted to the link structure and yieldingly engaging a member secured to one of the tongue or the tow bar for yieldingly resisting angular displacement of the link structure from the predetermined position.

3. The combination according to claim 2, wherein the yieldingly engaging means are mounted to a rear end of the link structure and wherein the member is secured to the tongue.

4. In a trailer hitch having an elongated tongue provided with first coupling means on its forward end, a tow bar defining front and rear ends and including mounting means for securing the tow bar to a rear portion of a towing vehicle, the bar including second coupling means coacting with the first coupling means to universally movably couple the first coupling means to the second coupling means, the improvement comprising: detent means operatively connected between the tongue and the tow bar for yieldingly resisting horizontal angular displacement of the tow bar with respect to the tongue about an upstanding axis from a predetermined position, the detent means including an elongated connecting link structure having a forward end pivotally secured to the tow bar rearwardly of the first and second coupling means for relative oscillation about a first upstanding axis, the link structure further having a rear end connected to the tongue for relative oscillation about an upstanding axis positioned rearwardly of the first axis, the rear end of the link structure and the tongue including means yieldingly resisting angular displacement of the link structure from the predetermined position, the tow bar including an arm assembly having a front end pivotally supported from the tow bar for oscillation about a horizontal transverse axis and a rear end comprising the portion of the tow bar to which the forward end of the link structure is pivotally secured.

5. The combination of claim 1 wherein means is provided interconnecting the corresponding pairs of opposite ends of said spring arms against movement away from each other.

6. The combination of claim 5 wherein said upstanding member is hollow and slidingly receives a jack standard therethrough.

7. The combination of claim 6 wherein said upstanding member includes means removably supporting it from said tongue.